United States Patent
Alvarez et al.

(10) Patent No.: US 7,183,910 B2
(45) Date of Patent: Feb. 27, 2007

(54) TIERED ON-DEMAND LOCATION-BASED SERVICE AND INFRASTRUCTURE

(75) Inventors: Julio Alvarez, Cary, NC (US); Phuc Ky Do, Morrisville, NC (US); Justin Monroe Pierce, Cary, NC (US); Susan Elizabeth Wince, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 11/016,163

(22) Filed: Dec. 17, 2004

(65) Prior Publication Data

US 2006/0145838 A1 Jul. 6, 2006

(51) Int. Cl.
*G08B 1/08* (2006.01)
*H04Q 7/00* (2006.01)

(52) U.S. Cl. ............... 340/539.13; 340/568.5; 340/425.5; 340/438; 705/10

(58) Field of Classification Search .......... 340/539.13, 340/426.33, 568.5, 825.36, 825.49, 425.5, 340/438; 701/211, 1, 36, 207, 300; 705/10
See application file for complete search history.

(56) References Cited

U.S. PATENT DOCUMENTS

| | | | |
|---|---|---|---|
| 4,541,049 A | | 9/1985 | Ahlbom |
| 4,882,724 A | * | 11/1989 | Vela et al. .................... 705/14 |
| 4,973,952 A | * | 11/1990 | Malec et al. ................ 340/5.91 |
| 5,287,266 A | | 2/1994 | Malec et al. |
| 5,406,271 A | * | 4/1995 | Sonnendorfer et al. .... 340/5.91 |
| 5,821,513 A | * | 10/1998 | O'Hagan et al. ........... 235/383 |
| 6,484,939 B1 | * | 11/2002 | Blaeuer ....................... 235/383 |
| 6,928,343 B2 | * | 8/2005 | Cato ............................ 701/24 |
| 7,006,982 B2 | * | 2/2006 | Sorensen ..................... 705/10 |
| 7,072,766 B2 | * | 7/2006 | Kato et al. .................. 701/211 |
| 7,084,765 B2 | * | 8/2006 | Clapper ................... 340/572.1 |
| 2002/0161651 A1 | * | 10/2002 | Godsey et al. ................ 705/22 |

FOREIGN PATENT DOCUMENTS

WO 02-48991 A2 6/2002

OTHER PUBLICATIONS

"Grocers Recognized for Breakthrough E-Marketing," http://w3.ibm.com/eworkplace/portlets/news/newsarticle.jsp?artid=NSGHT00020, Nov. 19, 2004.

* cited by examiner

*Primary Examiner*—Toan N. Pham
(74) *Attorney, Agent, or Firm*—Mark E. McBurney

(57) ABSTRACT

A location-based service includes detecting the relative motion of an on-site resource, such as a shopping cart, in addition to detecting the absolute position of the on-site resource, and displaying information on the on-site resource. The displayed information is based upon the detected relative motion and the detected absolute position. The relative motion is tracked and a position on a floor plan is deduced. This deduced position is adjusted, for example, synchronized or reset, as a function of and in response to the detected absolute position.

31 Claims, 5 Drawing Sheets

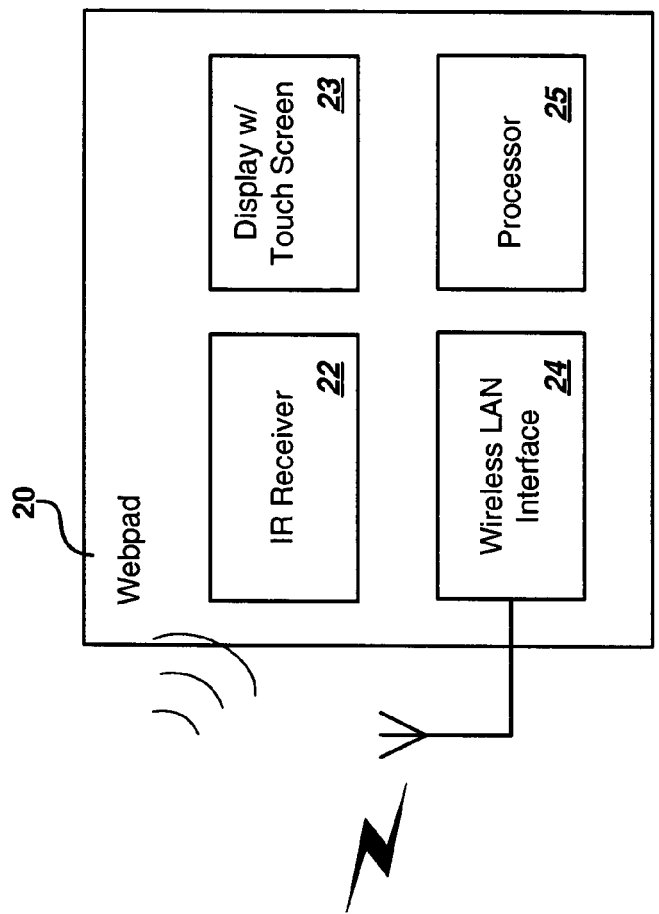
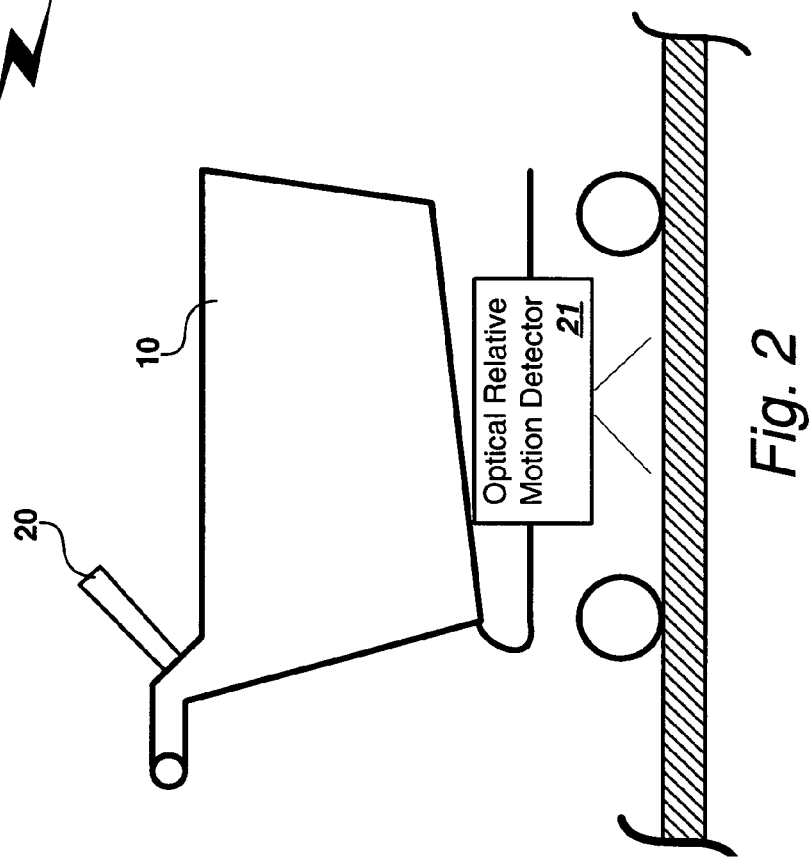

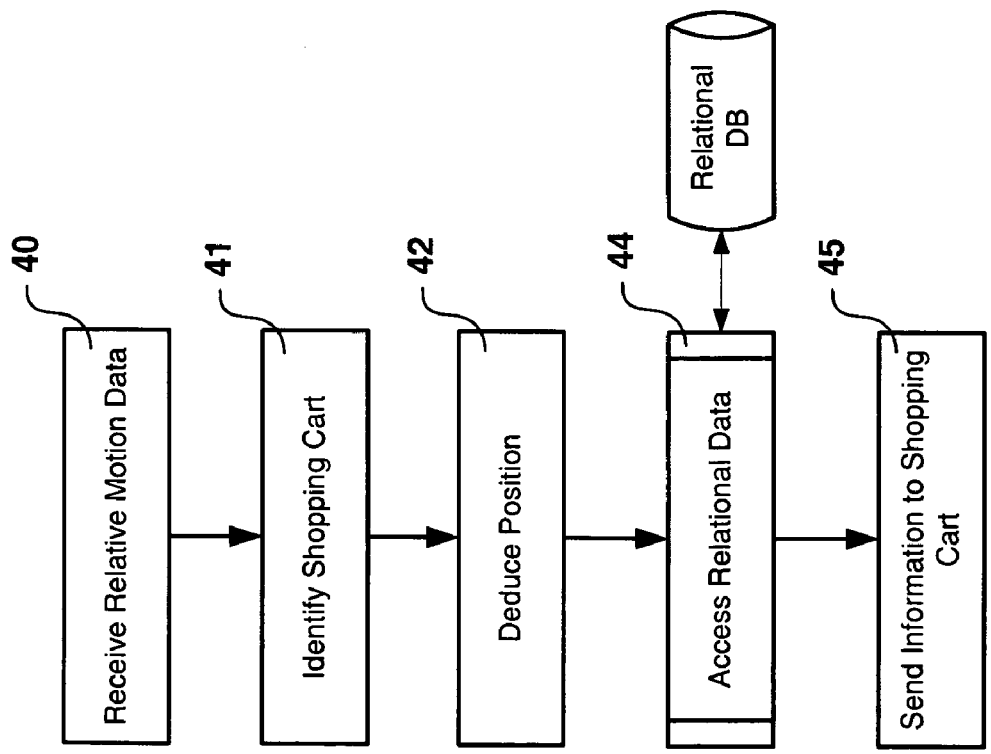

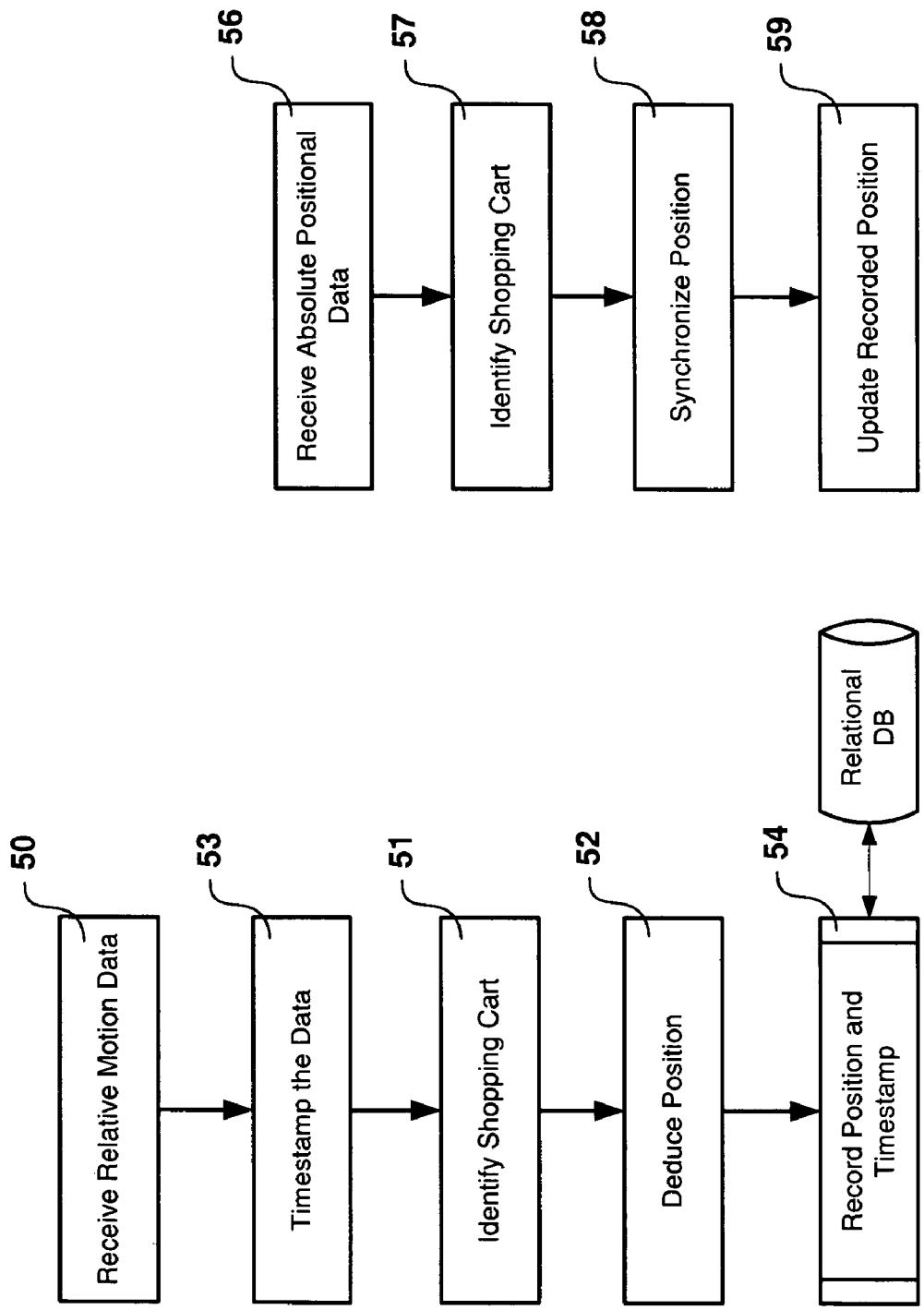

TIERED ON-DEMAND LOCATION-BASED SERVICE AND INFRASTRUCTURE

BACKGROUND OF THE INVENTION

This invention pertains to location-based services and to the deployment thereof. In particular, this invention relates to location-based service in which a high level of on-site resource location accuracy is achieved. More particularly, this invention relates to a location-based service in which resources are used only when needed and in which a high level of shopping cart location accuracy is achieved through a multi-tiered low-cost service infrastructure.

Location-based services are services which provide information or other deliverables in response to reception of geographic triggers. Such triggers include automated input or user entered input indicating a town name, zip code or street, the position of a mobile phone user or the general position of your car as you drive.

Location-based services find immediate benefit for retail store owners and the like by providing on-time coupons and promotions based on the location of a movable in-store resource such as a shopping cart. One known retail store location-based service includes: a plurality of non-overlapping IR beacons placed throughout the store each emitting absolute positional information which identifies the position of the IR beacon within the store; a plurality of shopping carts each having a display capable webpad mounted thereon which receives signals emitted by one of the IR beacons when brought within close proximity to the beacon and thereby determines the absolute position of the shopping cart and transmits the absolute positional information to a server; and a server which receives the transmitted absolute positional information from the shopping cart and correlates the absolute positional information to store promotions and coupons or other information which is to be transmitted to the shopping cart webpad for display thereon.

While the foregoing absolute positional location-based service and infrastructure provide immediate benefit to the store owner, the store owner faces a variety of problems and challenges.

One problem encountered by the store owner is that the location accuracy of such a system is limited to how closely the IR beacons can be placed. Because IR beacons must be placed in a non-overlapping configuration, and because the emitted IR beam is typically quite wide, the IR beacons are typically placed between eight and 15 feet apart along the center of the aisles throughout the store. While this level of accuracy yields some benefit, more accuracy is desired. For example, while accuracy of the present system may be sufficient to determine whether the shopper is in the deli section or in the vegetable section, there is insufficient accuracy for isolating down to the subsection or item level.

Another problem is encountered by the store owner when more accuracy is desired. To obtain more accuracy, the store owner must install and maintain a greater number of IR beacons and therefore incur additional installation and maintenance costs. Installation of additional beacons may involve replacement of the old beacons if the old beacons project an IR beam which is too wide. Maintenance involves the replacement batteries on a periodic basis and an increased number of beacons means more labor and parts cost in replacing a greater number of batteries. For example, suppose a store owner would like to increase the location accuracy from 15 feet to 8 feet. In this example, even though the electronics on the cart and the server electronics have not changed in the system, to get twice the accuracy, the store owner has to install and maintain twice as many IR beacons. Thus, the cost increases with increasing accuracy. This is clearly undesirable.

Yet another problem encountered with this system is that the infrastructure is, necessarily, always powered on. This severely limits the ability to enter into a power saving mode and leads to shortened battery life and needless wireless bandwidth consumption. The infrastructure must always be powered on because the IR beacons are the only means of detecting motion. That is, if any of the IR beacons were to be powered down, a passing shopping cart will miss the beacon and the store owner will miss an opportunity to pass on a promotion or coupon.

SUMMARY OF THE INVENTION

What is needed, therefore, are location-based services, program products, apparatus and methods which increase location accuracy beyond that which is practical or even possible with known implementations. Further, what is needed are location-based services, program products, apparatus and methods which provide the increased accuracy without significantly increasing the costs associated with installation and maintenance. Furthermore, the embodiments disclosed herein, as will be seen, provide for a high level of location accuracy through a multi-tiered low-cost infrastructure which requires fewer absolute positional references, for example IR beacons, than in known configurations.

Additionally, what is needed are location-based services, program products, apparatus and methods which are able to operate an infrastructure in a low-power on-demand mode while not missing any promotional opportunities.

As will be seen, the embodiments disclosed satisfy the foregoing needs and accomplish additional objectives. Briefly described, the present invention provides location-based services, program products, apparatus and methods for detecting the relative motion of an on-site resource (such as a shopping cart), detecting the absolute position of the on-site resource, and displaying information on the on-site resource. The displayed information is a function of the detected relative motion and the detected absolute position. The relative motion is tracked to deduce a position on a floor plan. This deduced position is adjusted as a function of and in response to the detected absolute position (for example, synchronized based on absolute positional information).

The on demand aspects of the various embodiments are achieved by transitioning electronics to a reduced power state in response to a detection of relative motion which is below a predetermined value. In other embodiments, the on demand aspects are achieved by maintaining electronics in a reduced power state and transitioning them to an operational state in response to a detection of relative motion.

In certain embodiments the displayed information is retrieved from a relational database which provides an association between information to be displayed and the deduced position on the floor plan. For example, a server may contain a relational database which associates the deduced location to promotional items and coupons which can be delivered on-time and in-context. However, the database need not be located at a central server and may be distributed to multiple computing devices such as the electronics on board the on-site resource (e.g., a shopping cart) and periodically updated as needed.

According to a services aspect of the present invention, a service provider provides a location-based service method for a business entity, such as a store owner, by detecting the relative motion of an on-site resource, detecting the absolute position of the on-site resource, and providing information for display on the on-site resource. The displayed information is a function of the detected relative motion and the detected absolute position. A tracking of the detected relative motion is used to deduce a position on a floor plan for the on-site resource. The deduced position is adjusted as a function of and in response to the detected absolute position.

According to one services aspect of the present invention, a shopping cart system is deployed by a services provider at a site by establishing an absolute positional reference at the site, for example, an IR beacon or a floor marking infrastructure providing indicia as to absolute position; by outfitting at least one shopping cart at the site with a display and a detector having the capacity to detect the established absolute positional reference and generate absolute positional data and to detect relative motion and generate relative motion data, and to transmit that data to a server; and by providing software for installation on the server having the capability to determine the on-site position of the shopping cart as a function of the relative motion, and absolute positional, data and transmit position-related information to the shopping cart display.

The relative motion detection can be, for example, based on optical mouse, ball mouse, or trackball technologies or any other relative motion detection technology, and can be outfitted on the shopping cart such that the floor provides the reference surface. In a preferred embodiment, the absolute positional detection can be based on decoding IR beacon transmissions. However, other implementations are contemplated. A floor marking infrastructure can be implemented by inscribing barcode patterns on the floor at predetermined positions within a site, each encoding absolute positional information, and by providing on-cart barcode recognition electronics to detect the positional information. Known triangulation schemes can also be used to detect absolute position. The detection of relative motion and absolute position may be performed by a single detector or by a combination of separate detectors. As an example of a single detector for both relative motion and absolute position, optical mouse technology can be used to detect relative motion in the conventional sense while at the same time the images captured by the optical mouse circuitry can be scanned for floor marking infrastructure patterns. Where the floor markings are barcode patterns, the absolute positional information can be derived by decoding the barcode pattern in the conventional sense. Where the floor markings are humanly readable characters, the absolute positional information can be derived by applying OCR, for example.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the nonlimiting detailed description set forth below.

BRIEF DESCRIPTION OF THE DRAWINGS

Some of the purposes of the invention having been stated, others will appear as the description proceeds, when taken in connection with the accompanying drawings, in which:

FIG. 2 is a side elevation view of a shopping cart configured in accordance with an embodiment of the present invention;

FIG. 3 is a schematic block diagram of the webpad outfitted into the shopping cart shown in FIG. 2;

FIG. 5 is a flow chart which illustrates the processing performed by a server configured in accordance with one embodiment of the present invention in response to receiving relative motion data from any shopping cart;

FIG. 6 is a flow chart which illustrates the processing performed by a server configured in accordance with one embodiment of the present invention in response to receiving absolute positional data from any shopping cart;

FIG. 7 is a flow chart which illustrates the processing performed by a server configured in accordance with one embodiment of the present invention in response to receiving relative motion data from any shopping cart; and FIG. 8 is a flow chart which illustrates the processing performed by a server configured in accordance with one embodiment of the present invention in response to receiving absolute positional data from any shopping cart.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
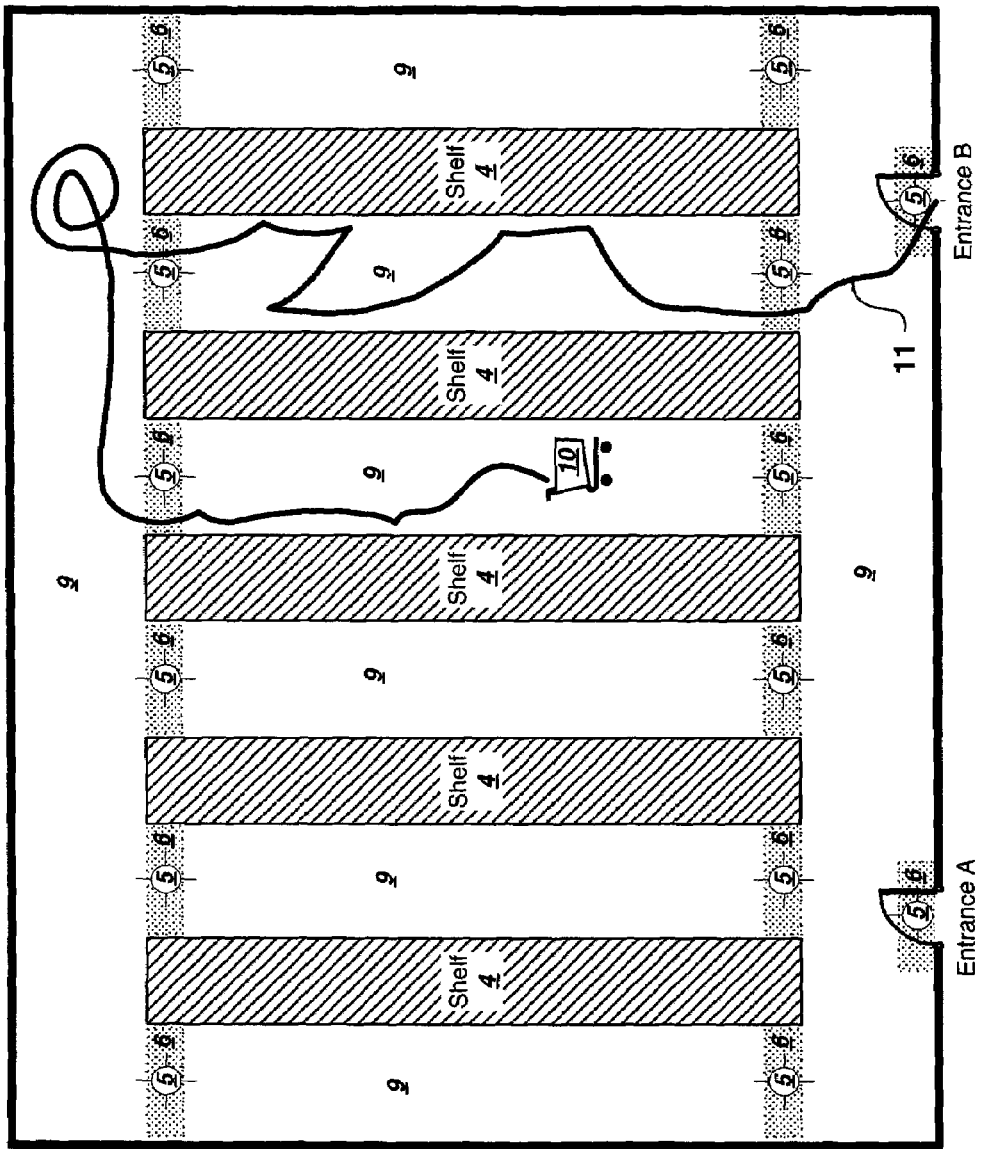
FIG. 1 is a plan view illustrating a store layout configured in accordance with a preferred embodiment of the present invention.

Referring now more particularly to the accompanying drawings, in which like numerals indicate like elements or steps throughout the several views, FIG. 1 is a plan view illustrating a store layout configured in accordance with a preferred embodiment of the present invention. A provider of services configures and deploys or otherwise specifies the overall store computing infrastructure shown in FIG. 1 for yielding an increased level of shopping cart location accuracy, for tracking and recording shopping cart travel patterns, and for providing on-time promotions and coupons at the shopping cart. The store 2 includes a variety of shelves 4, aisles 9, and two entrances A and B. The computing infrastructure includes IR beacons 5 placed at various synchronization points within the store 2. Each IR beacon 5 is configured to emit an infrared signal having, encoded therein, the absolute position of that infrared beacon within store 2. Thus, each infrared beacon emits a unique signal depending on its location. In addition, each IR emission covers an intentionally limited area shown as area 6.

The computing infrastructure further includes a server 8 and a plurality of shopping carts 10. Server 8 includes a wireless interface for wirelessly communicating with other portions of the infrastructure and is preferably located on the premises. Server 8 communicates with shopping cart 10 and optionally controls IR beacons 5. As will be described in further detail, each shopping cart 10 comprises a high-resolution relative motion detector capable of detecting all relative motion in two dimensions (any direction along the floor). As a shopping cart 10 moves through the store, the detected relative motion is wirelessly transmitted to server 8 whereat the travel patterns of the cart are tracked and recorded. Additionally, as the cart passes under any area 6, electronics onboard shopping cart 10 receives the IR beacon containing the absolute positional information emitted by the beacon. This information is also wirelessly transmitted to server 8 whereat the tracked position of the cart is synchronized to a known absolute position within the store.

IR beacon 5 includes infrared LEDs which transmit the infrared beam. The beam is scanned from one side to another along area 6 using standard scanning technology which typically includes a spinning or vibrating mirror or prism to spread the beam. For the most part, details concerning scanning technology and the like have been omitted in as much as such details are not necessary to obtain a complete understanding of the present invention and are within the skills of persons of ordinary skill in the relevant art. The transmitter circuits are adapted to encode the sweep angle of the beam in addition to the absolute position information which is unique to the IR beacon. This provides a higher level of detail for the absolute position synchronization of the present embodiment, and at the very minimum, provides the ability to determine whether the shopping cart is passing through area 6 toward, say, the left or right hand side of the aisle.

Other embodiments for IR beacon 5 are contemplated as well. For example, each IR beacon 5 can emit only the absolute positional information across each entire area 6. For this embodiment, the synchronization provided by IR beacon 5 does not distinguish one side of the aisle or another. However, in this embodiment, such information can be derived in software, albeit with less positional certainty, based on cart relative motion and known "out of bounds" areas such as shelf areas 4, as follows. IR beacon 5 places the cart in a particular aisle. In the case that the relative motion erroneously places the cart within the shelf areas 4, software recalibrates the tracked position of the cart to a position along the boundary of a particular shelf within that aisle. This embodiment may be deployed in installations where lower cost is of greater importance than tracking accuracy. The lower cost is achieved by using simplified IR beacons.

Another type of beacon which can be used in an alternative embodiment is an IR beacon having three sets of LEDs: one set each for left, middle, and right-hand side of the aisle. Each set of LEDs emits the absolute positional information of beacon 5, and information as to left, middle, or right sidedness. An array of lasers can also be used to give finer resolution at the synchronization points.

FIG. 2 is a side elevation view of a shopping cart configured in accordance with an embodiment of the present invention. A service provider deploys or outfits a plurality of shopping carts, as shown in FIG. 2, to include a webpad 20 and an optical relative motion detector 21. The service provider assesses the customer's inventory and provides those portions which the customer does not already have as a part of the service contract. Accordingly, if the store owning customer already has an inventory of shopping carts having no electronics, the service provider outfits each shopping cart with a relative motion detector 21 and a webpad 20. In cases where the shopping cart inventory already includes a webpad for other purposes, the shopping carts are outfitted with relative motion detector 21 and whichever portions of the webpad are needed. Should the pre-existing webpad include all necessary hardware components, the service provider need only configure the webpad according to the present embodiment, and/or integrate firmware or software code components thereinto.

As it pertains to the deployment of hardware, the term—deployment—, as used herein, connotes specific meaning. A service provider may deploy hardware by delivering hardware to a customer. The terms under which the hardware is deployed are tangential to the deployment itself and can be the subject of a sale, loan or lease, or any other arrangement. The hardware deployment can include less than all components required to implement an embodiment should the customer already have needed components which have been preinstalled, such as personal computers, or have an alternative source for such components. Accordingly, hardware deployment, as used herein, encompasses providing a specification to a customer for specific hardware required to implement the embodiment. The customer can then acquire the specified hardware from any source. The deployment of hardware further encompasses outfitting pre-existing hardware with needed components, and/or configuring newly deployed or pre-existing hardware according to the embodiment. Any needed configuration can be through manipulation of the hardware on-site or through integration of software components.

Referring again to FIG. 2, relative motion sensor 21 is wired to webpad 20 and detects relative motion via a well-known optical mouse sensor such as the Agilent ADNS-3060. This type of sensor uses a camera to capture thousands of pictures of a floor's surface every second. The sensor sends each captured image to an included digital signal processor (DSP) for analysis. Since the floor is imperfect, the DSP is able to detect floor patterns or elements in the images and determine how those patterns have moved based on a change in patterns over a sequence of images. Corresponding changes in relative coordinates include displacement along any direction, from zero to 360 degrees, along the two-dimensional floor surface. These relative coordinate changes are sent to webpad 20 for further processing in much the same way that an optical mouse sends relative coordinate changes to a computer upon detecting movement. Although relative motion sensor 21 is wired to webpad 20 in this embodiment, wireless coupling can also be used. For example, the interface between relative motion sensor 21 and webpad 20 can be Bluetooth, infrared, wireless LAN, etc.

FIG. 3 is a schematic block diagram of the webpad outfitted into the shopping cart shown in FIG. 2. The webpad includes a touch screen display 23 for displaying promotional items and like, an IR receiver 22 for receiving the IR signals emitted by IR beacon 5 within areas 6, an 802.11 (b) wireless LAN interface 24 having a wireless transceiver which provides wireless communication with server 8, and a processor 25 which couples and provides intercommunication for components 21–25. Webpad 20 includes a USB port which couples processor 25 via a USB cable (not shown) to relative motion detector 21.

Embodiments of the invention include embodiments having no touch screen display 23 and no webpad per se. As it will be seen, embodiments which are only concerned with tracking and recording customer habits, such as travel patterns, need only incorporate portions of the circuitry described in FIGS. 2 and 3. Such embodiments need only include relative motion sensor 21, processor 25, a wireless transceiver such as that provided by wireless LAN interface 24, and IR receiver 22 for receiving the IR beacon signals having included therein the absolute positional information. Further, where the absolute positional reference is provided through floor markings, the camera on board relative motion detector 21 can be used to capture and decode the absolute positional information. Thus, in such embodiments, IR receiver 22 is not needed. Furthermore, the wireless interface to server 8 need not be a LAN interface. Moreover, all needed components can be built into relative motion detector 21.

Referring again to FIG. 3, processor 25 receives the relative motion data sent by the relative motion detector 21 through the USB port and sends the relative motion data to server 8 through wireless interface 24. In like fashion, when IR receiver 22 detects the IR signal emitted by IR beacons 5, the absolute positional information included therein is passed to processor 25 which in turn sends the received absolute positional information to server 8 through wireless interface 24. The absolute positional information is received by IR receiver 22 as the shopping cart is brought within the proximity of an IR beacon 5 while crossing any of the areas 6. Since the information transmitted by the IR beacon identifies an absolute position on the floor plan, and further identifies which side of the aisle the beam is projected to, the transmitted absolute positional information indicates the absolute position of the shopping cart within the floor plan. As will be discussed in further detail with reference to the functionality of server 8, processor 25 receives promotional data or other information from server 8 through wireless LAN interface 24 for display on touch screen display 23. This promotional data or other information is a function of a deduced position for the shopping cart which is calculated by server 8 based on the sent relative motion data and absolute positional information.

Figure 4:
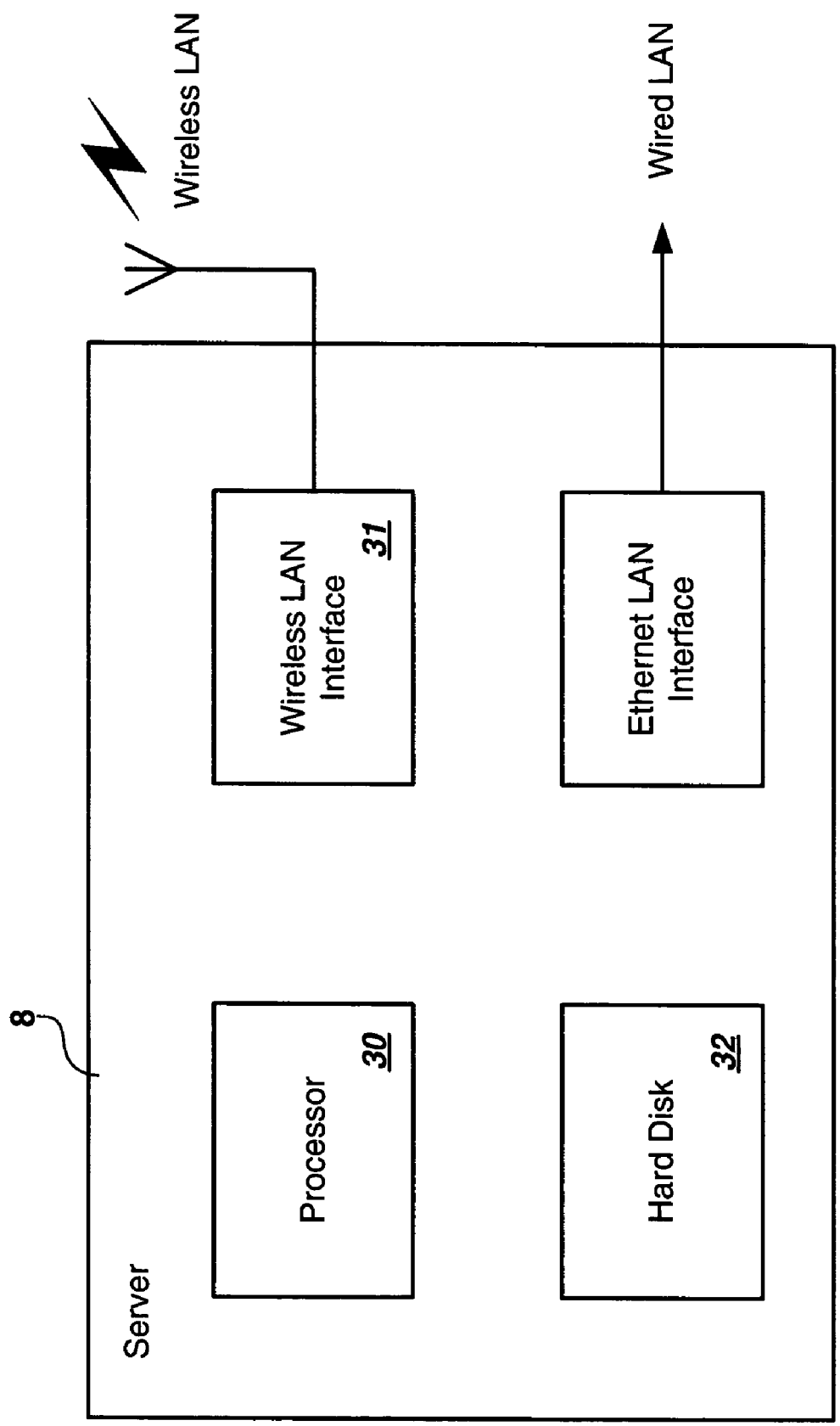
FIG. 4 is a schematic block diagram of a server configured in accordance with an embodiment of the present invention.

FIG. 4 is a schematic block diagram of server 8 shown in FIG. 1. Server 8 includes processor 30, wireless LAN interface 31, hard disk storage device 32, and an ethernet LAN interface. Processor 30 executes code stored in an accessible memory using well-known techniques and couples and controls the operation of wireless LAN interface 31, hard disk 32, and the wired ethernet LAN interface. Wireless LAN interface 31 provides access to a wireless 802.11 (b) ethernet network for wireless communication with the shopping cart webpads 20. While a wireless LAN interface is chosen for this embodiment, non local area network wireless communications can be used for both the server and the webpads. Hard disk 32 is used for, amongst other things, storing a database of information which associates store location data with store item data.

Although the embodiment described utilizes server 8 for executing databases and other software from a central location, other embodiments are contemplated which eliminate with the need for a server. For example, the databases and other software can be loaded directly onto the clients (the webpads on board each shopping cart) using any of the well-known distributed computing techniques. Database updates and software updates can be provided by a proxy computer, for example. Additionally, clients, servers, and proxies can be set up to operate in the usual manner for moving data in a hierarchical fashion.

The service provider deploys multi-tiered location-based service process software code into server 8, or otherwise configures server 8 to perform the processes to be described. As it pertains to the deployment of software, the term—deployment—, as used herein, connotes specific meaning. While it is understood that process software may be deployed by manually loading directly into the client, server, and proxy computers via loading a storage medium such as a CD, DVD, etc., the process software may also be automatically or semi-automatically deployed into a computer system by sending the process software to a central server or a group of central servers. The process software is then downloaded into the target computers that will execute the process software. Alternatively the process software is sent directly to the target system via e-mail. The process software is then either detached to a directory or loaded into a directory by a button on the e-mail that executes a program that detaches the process software into a directory. Another alternative is to send the process software directly to a directory on the target computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Once the process software is deployed into server 8, the process software is effective, when executing, to execute the processes shown in the flow charts.

FIG. 5 is a flow chart which illustrates the processing performed by server 8, according to one embodiment of the present invention, in response to receiving relative motion data from any shopping cart. Referring now primarily to FIG. 5, as a shopping cart is moved throughout the store, relative motion data is detected and transmitted in the manner previously described. The relative motion data is received 40 through the wireless LAN interface 31 on the server. To support multiple shopping carts, the received packets contain a shopping cart ID which is unique to each shopping cart. Upon receiving the data, the server scans the received packet for the shopping cart ID and thereby identifies 41 to which shopping cart the received relative motion data pertains. A position on the store floor plan 2 is deduced 42 for the shopping cart by tracking all received relative motion information for that cart. The tracking is a vector summation of all previously received relative motion coordinates (data) including the currently received data.

In order to satisfy initial conditions, no deduced position is presumed for a cart which has not reported an absolute position. Once and absolute position has been reported (to be described in relation to FIG. 6), deduction commences and continues.

The accuracy of the received relative motion data is high. Nevertheless, due to the nature of relative motion systems, a cumulative error is likely. This cumulative error is corrected for by synchronization with the absolute positional information provided by IR beacons 5.

Once the cart's position has been deduced 42, a relational database is accessed 44 to provide an association between information to be displayed on the shopping cart and the deduced position. To this end, server 8 contains a relational database stored in hard disk 32 which associates the deduced location to promotional items and coupons which can be delivered on-time and in-context. For example, the relational data may relate to an on-sale item which is proximate to the deduced position on the floor plan. In addition, as the shopping cart passes through specific areas in the store, informational messages can be transmitted 45 from server 8 for display on shopping cart 10 to enhance the shopping experience. For example, if the deduced position is near an entranceway and heading in an ingoing direction, a welcome message can be transmitted 45 and displayed; where the shopping cart is heading in an exiting direction, a thank-you and/or farewell message can be transmitted 45 and displayed. Likewise, as a shopping cart approaches the checkout area, directions for express checkout or for self checkout can be transmitted 45 and displayed on the shopping cart webpad 20. Based on the deduced position, server 8 can send 45 checkout information including totals for display on webpad 20 and a reminder for commonly forgotten items such as ice and the like. In an embodiment where the webpad includes a scanner to provide a running total as the items are entered into the shopping cart, a database can be accessed for each item scanned and any additional information can be transmitted 45 to the shopping cart and displayed. For example, where the shopper purchased a flashlight that does not come with batteries, the customer is reminded that batteries are required for the specific flashlight they are purchasing.

The server-transmitted position-dependent data is received at the shopping cart webpad 20 through wireless LAN interface 24. The data is processed by webpad processor 25 for display on touchscreen display 25.

The first tier of the location-based service is in the detection of relative motion at the shopping cart. The second tier of the location-based service is provided by the absolute position infrastructure. A third tier is provided by the services deployed through server 8 and/or directly by a service provider on-site or remote from the customer's site.

FIG. 6 is a flow chart which illustrates the processing performed by server 8, according to one embodiment of the present invention, in response to receiving 46 absolute positional data from any shopping cart. The shopping cart is identified 47 as per the identification 41 previously described with reference to FIG. 5 for the reception of relative motion data. Once the shopping cart is identified 47, the deduced position of the shopping cart is adjusted 48 (or corrected or synchronized) based on the received 46 absolute positional data. This synchronization trims out any cumulative error which might exist with the relative motion subsystem. The absolute positional information is decoded by reading the absolute position of the IR beacon and further by taking into account the sweep angle of the beam which is encoded into the transmission of each IR beacon 5. In this way it is possible to determine which side of the aisle a shopping cart is on. Higher resolution is also possible depending on the needs of the customer.

With the accuracy achieved by the present embodiment, the infrastructure is able to detect when the cart is "turning" into the aisle by detecting an arc pattern heading in the direction of the aisle. Thus, software executing on server 8 is able to transmit data pertinent to the aisle before the shopping cart enters the aisle. This early detection feature allows for less data to be transferred per instance and for presentation of data related to an item toward the end of the aisle. Data toward the end of the aisle can be missed in a system which uses only absolute positional data if the absolute positional beacons are placed within the aisle.

FIG. 7 is a flow chart which illustrates the processing performed by server 8, according to one embodiment of the present invention, in response to receiving relative motion data from any shopping cart. In this embodiment, reception 50, identification 51, and deduction 52 operate similarly to the corresponding items described with respect to the embodiment of FIGS. 5 and 6. In this embodiment, the service provider deploys code into server 8 which tracks the customer's travel pattern in such a way that the pattern is reproducible for later analysis. This service can be provided on-site, as shown in the embodiment, or off-site as a service provided for the customer by the service provider. As the relative motion data is received 50, the data is time-stamped 53 in order to provide real-time playback of customer travel patterns. The deduced position 52 and the timestamp are recorded 54 together in a database. Because timestamp data is included in the database of recorded travel patterns, the corresponding playback is able to include the pauses customers take during their shopping experience. Reconstruction of the travel pattern, including the pauses, can be useful for identifying problem areas in the store. An analysis can be compiled for the totality of travel patterns which may reveal the problem areas.

FIG. 8 is a flow chart which illustrates the processing performed by server 8 in response to receiving absolute positional data from any shopping cart. When absolute positional data is received 56 from the shopping cart in response to the shopping cart passing within the transmission region 6 of any IR beacon 5, the specific shopping cart is identified 57 and the deduced position adjusted 58 in a manner similar to that described in relation to items 47 and 48 of the embodiment depicted in FIGS. 5 and 6. In this embodiment, once the deduced position has been adjusted 58, the recorded position in the database is updated 59. This synchronization serves to trim out any cumulative error in the deduced position introduced by the relative motion infrastructure as previously described. A timestamp can also be recorded at the time of the reception 56 of the absolute positional data. The travel pattern recorded on hard disk 32 may include a one or both timestamps in association with the received 50 relative motion information and the received 56 absolute positional information.

A provider of services may perform a travel pattern analysis of a business entity by compiling customer tendencies related to the business entity. The analysis may be performed at the site or remotely over a network. The service provider then provides a report as a deliverable to the business entity based on the performed analysis.

Significantly, since relative motion is recorded and tracked along any direction along the two-dimensional floor space, the recorded travel patterns include travel along the length of the aisle, and in addition, travel having components which are perpendicular to the length of the aisle. As a result, store owners are able to detect, for example, a particular area in the layout in which customers frequently move from one side of the aisle to another while not progressing down the length of the aisle. This type of motion is not practically detectable with an infrastructure having only absolute position detection.

Referring now to any or all of the embodiments previously described, due to the transmission of relative motion data from a shopping cart each time the shopping cart is moved, the infrastructure is able to detect a lack of motion either in any specific area or in the entire store. When lack of motion is detected, electronics in any part of the infrastructure can be made to transition to a low-power mode. In this way, the infrastructure is available on demand.

In one embodiment, power savings are achieved in the IR beacons by reducing or removing power from the IR beacons in response to detecting shopping cart relative motion which is below a predetermined threshold value. This can be accomplished by removing power from the IR beacon's power line in the case where the IR beacon is not battery-operated.

Where the IR beacon is battery-operated, it typically includes an IR receiver or other wireless receiver which is able to receive power-on and power-off indications from other parts of the infrastructure. Where IR receivers are implemented, IR transmitters are deployed into server 8 and/or webpad 20. As is well known, receiver circuits consume less power than transmitter circuits in most technologies. Thus, power savings can be achieved in battery-operated versions of the IR beacon by keeping the receiver circuits on at all times and by cycling the transmission circuits on and off on-demand. On and off indications can be provided by either server 8 or directly by webpad 20 on the shopping cart.

In one embodiment, battery-powered IR beacon battery life is improved significantly by maintaining the entire IR beacon infrastructure "at rest" by default. In this mode, only the receiver is active and the transmitter is normally off. The transmitters only transmit the beacon when a request is received from a passing shopping cart webpad. Significantly, only portions of this infrastructure are active at any time to serve the different webpads in the store. This can be achieved by having the webpad transmit or broadcast a special request_ID_Broadcst packet to the IR beacon to request its ID. This transmission is sent only when the shopping cart is moving to conserve energy.

In like manner, positional information updates are not needed when a shopping cart is at rest. Accordingly, any portion of the shopping cart electronics can be maintained in a reduced power state and be made to transition to an increased power state in response to the detection of relative motion signals on the USB interface. Thus, portions of the webpad can transition to S2 or S3 mode and the bios onboard the webpad can be set up to "Wake on USB." Conversely, portions of the deployed shopping cart electronics can be powered on by default and made to transition to a low power state in response to detecting relative motion of the shopping cart which is below a predetermined threshold value.

Alternatively, server 8 can direct of all the IR beacons to power off, detect relative motion and accurately keep track of where a cart is, detect entry into a synchronization area 6, and temporarily power on the corresponding beacon to obtain the absolute positional information.

Embodiments of the present invention include various functions, which have been described above. The functions may be performed by hardware components or may be embodied in machine-executable instructions as firmware or software, which may be used to cause a general-purpose or special-purpose processor programmed with the instructions to perform the functions. Alternatively, the functions may be performed by a combination of hardware, firmware and software.

An Embodiment of the present invention may be provided as a computer program product which may include a machine-readable medium having stored thereon instructions which may be used to program a computer (or other electronic devices) to perform a process according to any of the embodiments of the present invention. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

In the drawings and specifications there has been set forth a preferred embodiment of the invention and, although specific terms are used, the description thus given uses terminology in a generic and descriptive sense only and not for purposes of limitation.

We claim:

1. A method comprising:
   detecting the relative motion of an on-site resource;
   detecting the absolute position of the on-site resource; and
   displaying information on the on-site resource, the displayed information being a function of said detected relative motion and said detected absolute position wherein a tracking of said detected relative motion is used to deduce a position on a floor plan, the deduced position being adjusted as a function of and in response to said detected absolute position.

2. The method of claim 1 wherein said displayed information is retrieved from a relational database which provides an association between information to be displayed and the deduced position on the floor plan.

3. The method of claim 1, further comprising:
   transitioning battery powered electronics to a reduced power state in response to a detection of relative motion which is below a predetermined value.

4. The method of claim 1, further comprising:
   maintaining battery powered electronics in a reduced power state and transitioning the battery powered electronics to an increased power state in response to the detection of relative motion.

5. A method comprising:
   detecting the relative motion of an on-site resource which is movable within a site and based thereon generate relative motion data;
   detecting an absolute positional reference and based thereon generate absolute positional data, the absolute positional reference being indicative of an absolute position within the site;
   wirelessly communicating the relative motion, and absolute positional, data between the on-site resource and a server;
   tracking the relative motion data to deduce an on-site position for the on-site resource;
   adjusting the deduced position as a function of and in response to the wireless communication of the absolute positional data;
   associating the on-site position to position-dependent information;
   wirelessly communicating the position-dependent information to the on-site resource; and
   displaying the position-dependent information on the on-site resource.

6. The method of claim 5 wherein the absolute positional reference is a battery powered IR beacon which emits an IR signal into which absolute positional information is encoded, the on-site resource being able to detect the IR signal in response to being brought within a predetermined distance from the beacon, the method further comprising:
   reducing power from the IR beacon in response to detecting relative motion of the on-site resource which is below a predetermined value.

7. The method of claim 5 wherein the absolute positional reference is a battery powered IR beacon which conditionally emits an IR signal into which absolute positional information is encoded, the beacon being maintained in a reduced power state in which only a receiver through which a relative motion signal is received is active, the on-site resource being able to detect the IR signal in response to being brought within a predetermined distance from the beacon, the method further comprising:
  transitioning the beacon to an increased power state in which the IR signal is transmitted in response to a reception of the relative motion signal.

8. The method of claim 5, further comprising:
  transitioning battery powered electronics to a reduced power state in response to a detection of relative motion which is below a predetermined value.

9. The method of claim 5, further comprising:
  maintaining battery powered electronics in a reduced power state and transitioning the battery powered electronics to an increased power state in response to the detection of relative motion.

10. The method of claim 5 wherein the relative motion is detected by capturing consecutive images of a floor and measuring displacement of common image elements between consecutively captured images.

11. The method of claim 10 wherein the absolute positional reference is a floor marking.

12. Apparatus comprising:
  a processor which executes code stored in an accessible memory;
  a storage device which is accessible to said processor and which retains stored data after power is removed from the storage device; and
  a wireless network interface which is accessible to said processor and through which access to a wireless network is provided;
  wherein the processor executes code which is effective to:
    receive, through said wireless network interface, relative motion information which relates to an on-site resource;
    deduce a position on a site floor plan for the on-site resource by tracking the received relative motion information;
    receive, through said wireless network interface, absolute positional information which relates to the absolute position of the on-site resource within the site floor plan;
    adjust the deduced position as a function of and in response to the received absolute positional information; and
    send information over said wireless network interface for display on the on-site resource.

13. Apparatus according to claim 12 wherein the on-site resource is a shopping cart.

14. Apparatus according to claim 13 wherein the sent information for display on the shopping cart is based on relational data retrieved from said storage device and relating to the deduced position on the floor plan.

15. Apparatus according to claim 14 wherein the relational data relates to an on-sale item which is proximate to the deduced position on the floor plan.

16. Apparatus comprising:
  a shopping cart;
  a relative motion detector included on said shopping cart which generates relative motion data which is indicative of the relative motion of said shopping cart; and
  an information handling unit which is mounted on said shopping cart and operatively coupled to said relative motion detector and which includes a display device, a processor, and a wireless transceiver;
  said information handling unit being effective to:
    send the relative motion data to an on-site server through the wireless transceiver;
    receive absolute positional information through the wireless transceiver, the absolute positional information being indicative of the absolute position of said shopping cart within a site floor plan;
    send the received absolute positional information to the on-site server through the wireless transceiver;
    receive informational data from the on-site server through the wireless transceiver; and
    display the informational data on the display device.

17. Apparatus according to claim 16 wherein the informational data is a function of the sent relative motion data and absolute positional information.

18. Apparatus according to claim 17 wherein the informational data further relates to an on-sale item which is proximate to a deduced position on the floor plan calculated by the on-site server as a function of the sent relative motion data and absolute positional information.

19. Apparatus according to claim 16 wherein said relative motion detector includes an image capture device and detects relative motion in at least two dimensions by capturing consecutive images of a floor and measuring displacement of common image elements between consecutively captured images.

20. Apparatus according to claim 16 wherein at least a portion of the information handling unit transitions to a reduced power state in response to detecting relative motion of the on-site resource which is below a predetermined value.

21. Apparatus according to claim 16 wherein at least a portion of the information handling unit is maintained in a reduced power state and wherein a transition to an increased power state is made in response to the detection of relative motion.

22. A method comprising:
  providing a location-based service for a business entity by:
    detecting the relative motion of an on-site resource;
    detecting the absolute position of the on-site resource; and
    providing information for display on the on-site resource, the displayed information being a function of said detected relative motion and said detected absolute position wherein a tracking of said detected relative motion is used to deduce a position on a floor plan, the deduced position being adjusted as a function of and in response to said detected absolute position.

23. A method comprising:
  deploying a shopping cart system at a site by:
    establishing an absolute positional reference at the site;
    outfitting at least one shopping cart at the site with a display and a detector having the capacity to detect the established absolute positional reference and generate absolute positional data and to detect relative motion and generate relative motion data, and to transmit that data to a server; and
    providing software for installation on the server having the capability to determine the on-site position of the shopping cart as a function of the relative motion, and absolute positional, data and transmit position-related information to the shopping cart display.

24. A method comprising:
  deploying computing infrastructure into a movable on-site resource, the deployed infrastructure provides the on-site resource with the ability to:
    detect its relative motion and based thereon generate relative motion data;

detect an absolute positional reference and based thereon generate absolute positional data, the absolute positional reference being provided at the site and being indicative of an absolute position within the site;

wirelessly transmit the relative motion data and the absolute positional data;

wirelessly receive data; and display the received data on-resource; and integrating server executable code into a server which is configurable to wirelessly receive data from and transmit data to said deployed computing infrastructure, wherein the code is executable on the server to:

wirelessly receive the relative motion data and the absolute positional data;

track the relative motion data to deduce an on-site position for the on-site resource, the deduced position being adjusted as a function of and in response to the wireless reception of the absolute positional data;

associate the on-site position to position-dependent information; and wirelessly transmit the position-dependent information for display on the on-site resource.

25. The method of claim 24 wherein said deployed computing infrastructure is infrastructure selected from the group consisting of hardware, firmware, software, and combinations thereof.

26. The method of claim 24 wherein the absolute positional reference is an IR beacon and wherein the on-site resource is able to detect the absolute positional reference in response to being brought within a predetermined distance from the beacon.

27. The method of claim 26 wherein the on-site resource is a shopping cart.

28. The method of claim 24 wherein the relative motion is detected by capturing consecutive images of a floor and measuring displacement of common image elements between consecutively captured images.

29. The method of claim 28 wherein the absolute positional reference is a floor marking.

30. A product comprising:

a computer usable medium having computer readable program code stored therein, the computer readable program code in said product being effective to:

detect the relative motion of an on-site resource;

detect the absolute position of the on-site resource; and display information on the on-site resource, the displayed information being a function of said detected relative motion and said detected absolute position wherein a tracking of said detected relative motion is used to deduce a position on a floor plan, the deduced position being adjusted as a function of and in response to said detected absolute position.

31. A product comprising:

a computer usable medium having computer readable program code stored therein, the computer readable program code in said product being effective to:

detect the relative motion of an on-site resource which is movable within a site and based thereon generate relative motion data;

detect an absolute positional reference and based thereon generate absolute positional data, the absolute positional reference being indicative of an absolute position within the site;

wirelessly communicate the relative motion, and absolute positional, data between the on-site resource and a server;

track the relative motion data to deduce an on-site position for the on-site resource;

adjust the deduced position as a function of and in response to the wireless communication of the absolute positional data;

associate the on-site position to position-dependent information; and wirelessly communicate the position-dependent information to the on-site resource;

display the position-dependent information on the on-site resource.

* * * * *